(12) United States Patent
Watkinson

(10) Patent No.: US 6,213,721 B1
(45) Date of Patent: Apr. 10, 2001

(54) NOISE EMISSION REDUCTION

(75) Inventor: Peter Watkinson, Dorset (GB)

(73) Assignee: Thomson Marconi Sonar Limited, Middlesex (GB)

(*) Notice: Subject to any disclaimer, the term of this patent is extended or adjusted under 35 U.S.C. 154(b) by 0 days.

(21) Appl. No.: 08/685,936

(22) Filed: Jul. 22, 1996

Related U.S. Application Data

(63) Continuation-in-part of application No. 08/322,001, filed on Oct. 12, 1994, now abandoned.

(30) Foreign Application Priority Data

Nov. 9, 1993 (GB) ................................................ 9323026

(51) Int. Cl.⁷ .................................................. F03D 11/04
(52) U.S. Cl. ................ 416/244 A; 416/500; 416/244 R; 416/119; 188/379
(58) Field of Search .......................... 415/119; 416/9–11, 416/244 R, 244 A, 500; 188/379, 380; 248/615, 632, 634, 636, 638; 181/207, 208

(56) References Cited

U.S. PATENT DOCUMENTS

| | | | |
|---|---|---|---|
| 3,388,772 | * | 6/1968 | Marsh et al. ........................ 188/379 |
| 4,011,397 | * | 3/1977 | Bouche ............................... 248/74 R |
| 4,050,659 | * | 9/1977 | McCannon et al. ................. 248/346 |
| 4,373,608 | * | 2/1983 | Holmes ............................... 181/208 |
| 4,692,094 | * | 9/1987 | Kulinyak ............................. 416/11 |
| 4,962,826 | * | 10/1990 | House ................................. 181/207 |

FOREIGN PATENT DOCUMENTS

| | | | |
|---|---|---|---|
| 524566 | * | 7/1992 | (EP) . |
| 1154170 | * | 4/1958 | (FR) . |
| 1257985 | * | 2/1961 | (FR) . |
| 2238411 | * | 2/1975 | (FR) . |
| 1599020 | * | 9/1981 | (GB) . |
| 2259131 | * | 3/1993 | (GB) . |
| 58-30546 | * | 2/1983 | (JP) ..................................... 188/379 |
| 83/04287 | * | 12/1983 | (WO) ................................... 415/119 |

* cited by examiner

*Primary Examiner*—Cristopher Verdier
(74) *Attorney, Agent, or Firm*—Donald C. Casey

(57) ABSTRACT

A structure for eliminating or reducing noise emission from a structure which vibrates at two or more discrete frequencies is described. Vibration damping tiles are secured to the surface of the structure with each tile have a high density layer linked to the structure by a layer of plastic material, such as polyurethane foam, with the mass of the high density layer, the dimensions of the layer of the plastic material and the properties of the plastic material selected so that the compression mode and shear mode resonant frequencies correspond to two of the discrete frequencies of the structure. The noise suppression device is particularly suited for use with wind turbines.

24 Claims, 4 Drawing Sheets

Frequency Ratio Against Shape Factor

NOISE EMISSION REDUCTION

CROSS REFERENCE TO RELATED PATENT APPLICATION

This application is a continuation-in-part of application Ser. No. 08/322,001, filed Oct. 12, 1994, and now abandoned. The disclosure of said parent case is now hereby incorporated by reference.

BACKGROUND OF THE INVENTION

This invention relates to noise emission reduction and particularly to the reduction of noise emitted by the tower of a wind turbine.

Wind turbines conventionally comprise a tall toward of circular or polygonal cross-section with a nacelle mounted at the top, the nacelle mounting a large multi-bladed propeller rotating about the horizontal axis and connected through a system of gears to an electrical generator also contained within the nacelle, the nacelle is arranged to rotate about a vertical axis on top of the tower so as to keep the propeller disc facing into the wind. All of the parts driven by the turbine mechanically are contained within the upper nacelle and electrical power generated within the nacelle is carried down the tower and away to its destination by the cables and rotary electrical connectors.

Since the wind turbine includes a generator and associated gearing the wind turbine inevitably generates noise. Due to the necessity to place wind turbines on high windswept points and due to the fact that the noise is generated by the parts at the top of the wind turbine such noise can be a problem over a large area around the wind turbine since the noise can travel along a direct straight line path to considerable distances without encountering any absorbing obstruction.

This problem is accentuated by the fact that most wind turbines generate noise at two or more discrete frequencies which are distinctive of the wind turbine design as well as generating noise across a continuous spectrum so where a farm of a number of identical wind turbines is set up their combined noise at these discrete frequencies, being at the same frequency for all of the turbines, can carry for several miles.

It has been found that a major source of this noise is mechanical vibrations generated by the moving parts inside the nacelle which transmitted into the nacelle structure and then into the tower. This mechanical vibrations causes the tower structure to vibrate and it is this vibration of the tower structure which emits the noise.

It has been attempted to solve this problem by fitting vibrating isolating mounts between the machinery is the nacelle and the actual nacelle and tower structures but this has been fully effective in eliminating this noise.

This invention was intended to eliminate or at least reduce noise emission from wind turbine towers, but may have other applications.

BRIEF DESCRIPTION OF THE INVENTION

According to a first aspect this invention provides apparatus for reducing noise emission from a structure vibrating at two or more discrete frequencies, the apparatus comprising a plurality of vibration damping tiles secured to the surface of the structure, each tile comprises a high density layer linked to the structure by a layer of plastics material and has compression and shear modes of vibration and associated resonant frequencies, the mass of the high density layer, the dimensions of the layer of plastics material and the properties of the plastics material being selected such that the compression mode and shear mode resonant frequencies correspond respectively to two of said discrete frequencies.

Employing the present invention provides a cost effective means of reducing vibrations from a structure at two frequencies, and is particularly applicable to wind turbines. Accordingly a second aspect of the invention provides a wind turbine comprising a nacelle, the nacelle generating noise in the support tower at two or more discrete frequencies or frequency bands, a surface of the support tower having at least one vibration damping tile secured to it, the at least one tile comprising a high density layer linked to the tower by a less dense plastics material and has compression and shear modes of vibration and associated resonant frequencies, the mass of the high density layer, dimensions of the layer of plastics material, and the properties of the plastics material being selected such that the compression mode and shear mode resonant frequencies correspond respectively to two or said discrete frequencies or frequencies bands of the nacelle and act to reduce the amplitude of vibration of the support tower at those frequencies or frequency bands.

Noise at the two frequencies to which the tile is tuned can be eliminated, or at least reduced, in the support structure of a wind turbine in accordance with the second aspect of the invention. The invention is particularly advantageous as the tiles can be fitted to either new or existing structures. Furthermore in the case of existing structure employing tiles which act to suppress two different frequencies halves the number of tiles and associated area that would otherwise be required. This is particularly advantageous for it enables sufficient tiles to be placed on the inner wall of a wind turbine support tower above the safety door normally about 6 feet below the top of the tower. Once in this region safety equipment used whilst climbing the tower can be removed and the tiles can then be bounded to the inner walls while standing on the safety platform.

According to a third aspect of the present invention there is provided a method of reducing vibrations in a structure comprising the steps of:

identifying two frequencies or frequency bands in the structure that it is desired to suppress;

constructing a plurality of mass damping tiles each comprising a high density layer and a layer of plastics material by which the high density layer is to be connected to the structure;

selected the mass of the high density layer, the dimensions of the plastics material, and the properties of the plastics material such that the tile has a compression mode resonant frequency corresponding to one of the identified frequency or frequency bands, and a shear mode resonant frequency corresponding to the other identified frequency or frequency band; and securing said plurality of tiles to the structure.

The present invention arose whilst the invention were designing a tile to suppress noise at a single frequency or frequency band, corresponding to the compression resonant frequency of the tile. During the course of their work it was realised that other resonant modes may be present within the tile and that it may be possible to exploit these. However there are difficulties in getting a single tile to operate at two predetermined frequencies, for altering any one parameter of the tile affects both frequencies. However when investigated it was found that according to the theory below it should be possible for a limited range of frequencies to create a tile which would have two distant resonant frequencies, one in compression mode and one in shear mode, and that such a tile would cover the two frequencies of particular concern in a wind turbine application.

Notation: $f_6$=resonant shear frequency
$f_c$=resonant compression frequency
m=mass of the steel plate
A=loaded area of the plastics layer (PU)
t=thickness of the PU
$E_c$=compression modulus PU
E=Young's modulus PU
G=shear modulus PU
B=bulk modulus PU
S=shape factor=loaded area/free area
K=spring stiffness
k=constant The rigid body resonant frequencies of the tile may be calculated from the following:

$$f = \frac{1}{2\pi}\sqrt{K/m} \qquad (1)$$

where $K=E_c A/t$ for compression frequency and K=G A/t for the shear frequency.

The compression modulus is calculated from $$Ec = E(1+2kS^2)/[1+E(1+2kS^2)/B] \qquad (2)$$

This expression was taken from 'Engineering Design with Natural Rubber' by P. B. Lindley published by The Malaysian Producers' Research Association. Tables for values of k for a given hardness are also to be found in this publication.)

The ratio of the resonant frequencies can therefore be calculated as:

$$f_c/f_s = [E(1+2kS^2)/G(1+E\ 1+2kS^2)/B]^{1/2}$$

It is seen from equation (3) that the ratio of the two resonant frequencies is dependent on the shape factor since all the other parameters in the equation are fixed once the plastics material, normally polyurethane (PU) material is selected.

The shape factors of the layer is controlled by its loaded area, aspect ratio and thickness. The aspect ratio is defined as the ratio of the width to length of the loaded area. For low shape factors the PU would be cut into a number of rectangular blocks whilst maximising the thickness and aspect ratio. In contrast, a high shape factor is obtained by a continuous and thin square PU layer. The mass required for a selected loaded area and thickness is simply calculated from the shear resonant frequency equation—eq. (1).

Therefore, for a given PU material it is seen that a tile can be designed with two independent resonant frequencies in shear and compression by selecting a combination of shape factor, loaded area, thickness and mass. Practical restrictions such as tile footprint area, overall tile thickness and utilisation of standard steel plate section necessitate an iterative procedure in order to optimize the selection of the tiles' geometric parameters. The following is a summary of the design steps required.

1. Determine the two frequencies to be suppressed and select $f_c$ and $f_s$ - - $f_c$ will always be higher than $f_s$.

2. Select size of mass, normally steel, for acceptable footprint area and considerations of practical constraints on width, length, height and dimensions of standard steel plate.

3. Using equation (1), experimentally determine the shear modulus G for the selected plastics material substituting G A/t for K, plotting shear frequency against different areas to determine G at the desired shear frequency, as shown in FIG. 1.

4. Make an approximation for the value of Young's Modulus E for the layer and, substituting this in equation (3), obtain an approximate value for S. B can be estimated.

5. Generate a number of tiles having different loaded area to free area ratios close to the approximate value of S and measure $f_s$ and $f_c$ for each to produce a number of points which may be plotted as illustrated in FIG. 2.

6. Empirically determine the value for E in equation (3) which produces the "best fit" line for the points obtained in step 5 and define this as the effective value of E.

7. For the above calculated value of E, calculate a more precise value of S from equation (3) and generate appropriate tile. Note the aspect ratio of the layer, that is the ratio of width to length of the loaded area will have to be varied to control the value of S without altering the loaded area. Concerning step number 5, as an example in one embodiment, tiles are mounted to less than one third of the structure and in another embodiment at least half of the radiating surface of the support structure is free of any noise insulating material.

BRIEF DESCRIPTION OF THE DRAWINGS

Apparatus employing the invention will now be described by way of example only with reference to the accompanying diagrammatic figures, in which.

DETAILED DESCRIPTION

Figure 1:
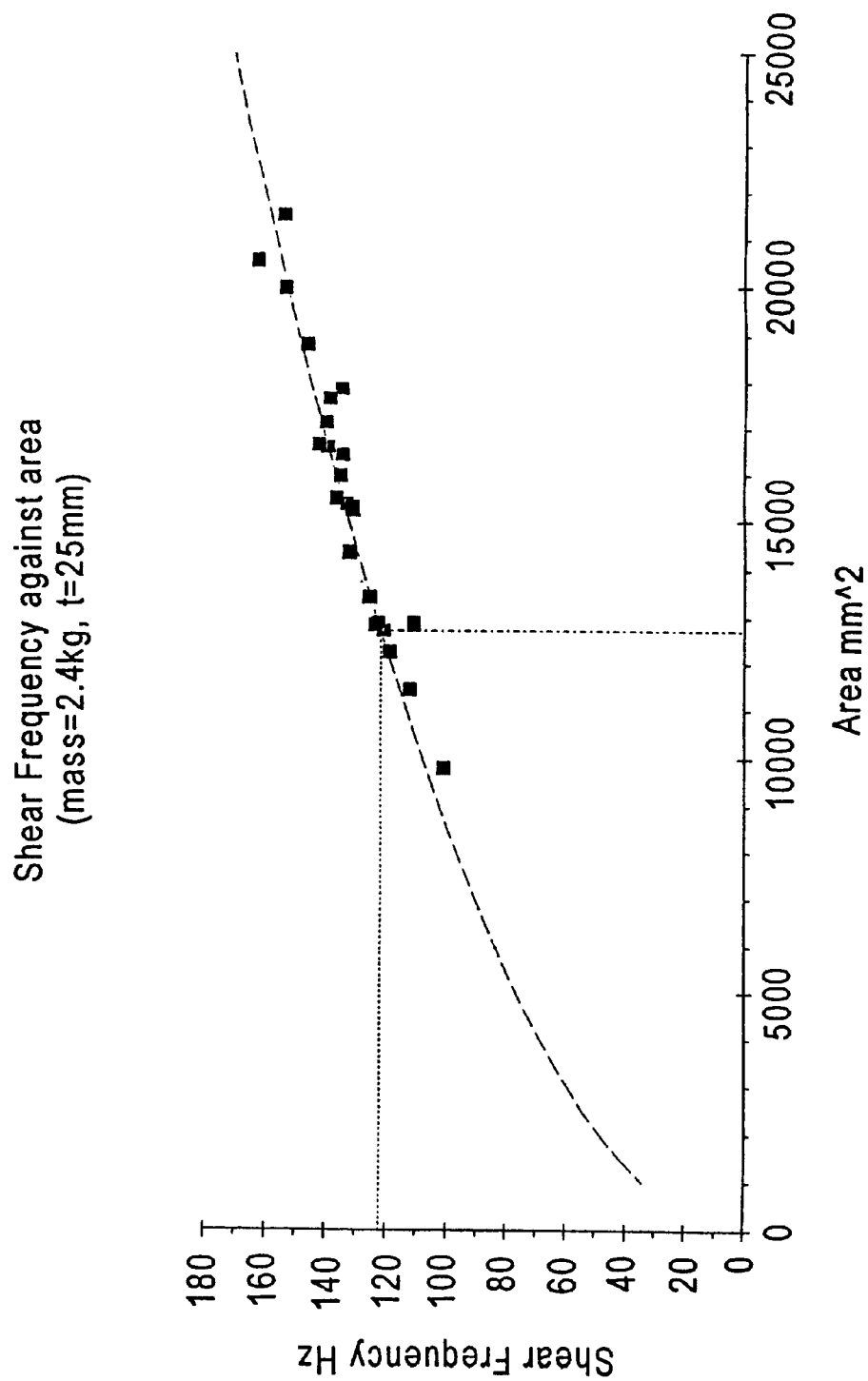
FIG. 1 is a graph depicting shear frequency against area.
Figure 2:
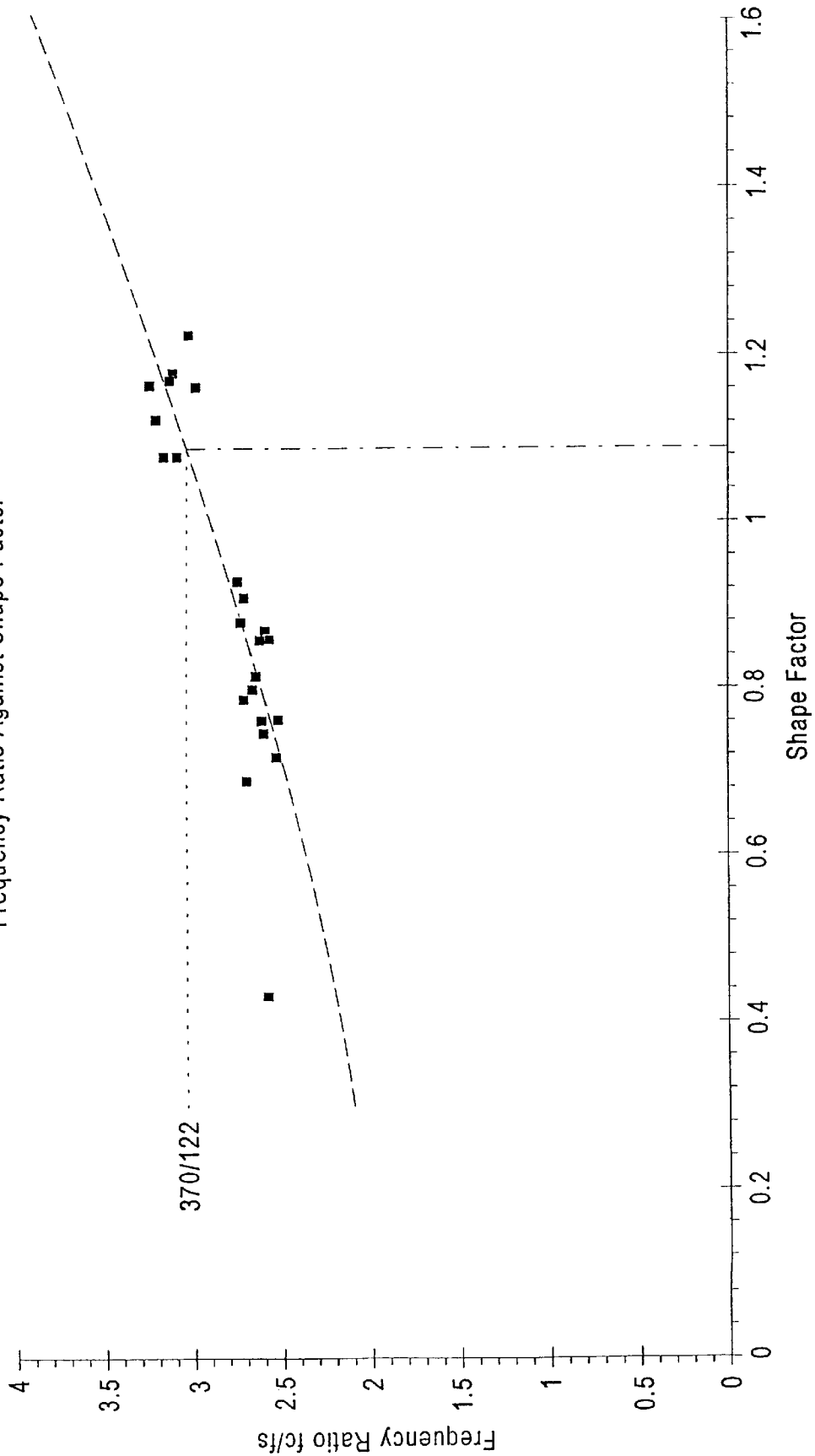
FIG. 2 is a graph depicting the frequency ratio against the shape factor.
Figure 3:
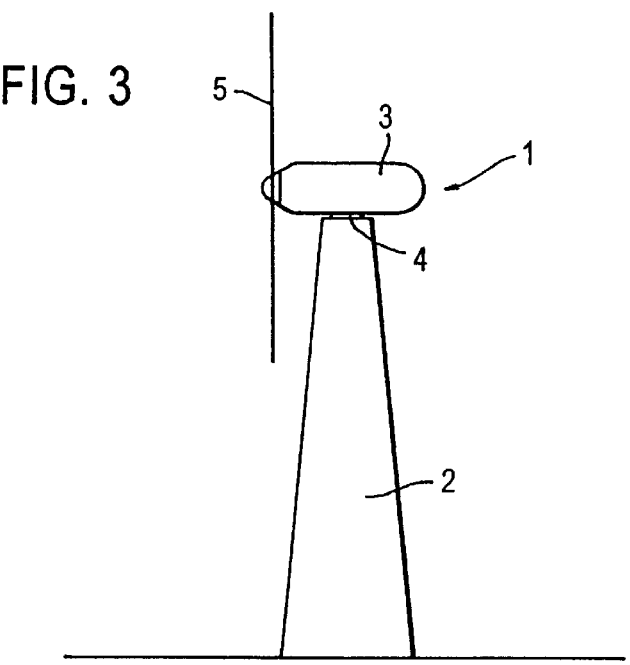
FIG. 3 shows a general view of a wind turbine employing the present invention.

Referring to FIG. 3 a wind turbine 1 is shown. The wind turbine 1 comprises a supporting tower 2 bearing a streamlined nacelle 3 at its upper end. A rotary joint 4 is situated between the tower 2 and the nacelle 3 to allow rotation of the nacelle 3 relative to the tower 2. At one end of the nacelle 3 a plurality of wind turbine vanes 5 are arranged symmetrically to form a turbine disc rotating about a horizontal axis. The vanes 5 are attached to a shaft inside the nacelle 3 which drives an electrical generator through suitable gearing, such arrangements are well known and need not be described in detail here.

The support tower 2 is circular in cross-section in order to minimise wind loads and is tapered with a larger diameter at its bottom end than its top end.

It has been found that the troublesome noise emissions from such wind turbines are caused by mechanical noise from the shaft, bearings, gearing and electrical generator within the nacelle 3 being transmitted into the structure of the support tower 2 and causing the outer surface of the support tower 2 to vibrate at the same frequency as the driving mechanical vibration. This vibration is substantially eliminated by arranging a plurality of acoustically absorbing tiles 6 on the outer surface of the support tower 2 to absorb the vibration.

Figure 4:
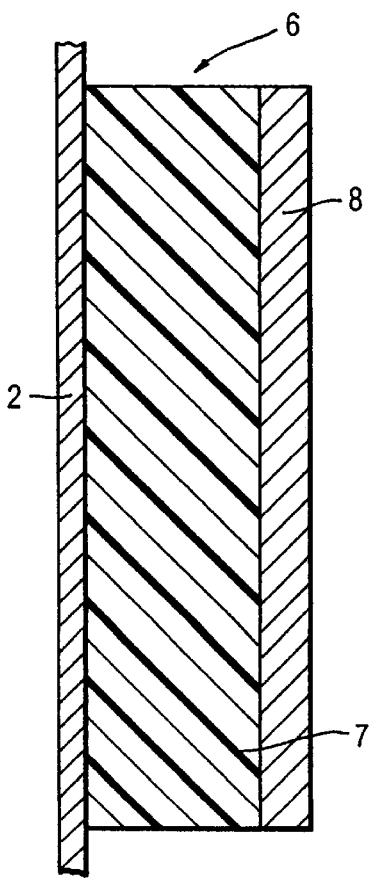
FIG. 4 shows a first type of vibration absorbing tile according to the present invention mounted on a wind turbine; and, FIGS. 5A and 5B show a specific example of an actual tile according to the present invention for mounting on a wind turbine, similar parts having the same reference numerals throughout.

Referring to FIG. 4 a first type of acoustically absorbing tile 6 secured to the outer surface of the support tower 2 is shown in cross-section. The acoustically absorbing tile 6 comprises a first layer 7 of polyurethane plastics material (PU), which may be a foam, and a metal plate 8 attached to the PU 7. The free surface of the PU layer 7 opposite the metal plate 8 is secured to the inner surface of the support tower 2 by adhesive.

In operation each acoustically absorbing tile 6 acts as a vibration damper, in both shear and compression modes of the damped weight and spring resonator type with the metal plate 8 being the weight and the PU 7 acting as the spring as previously described.

Figure 5A:
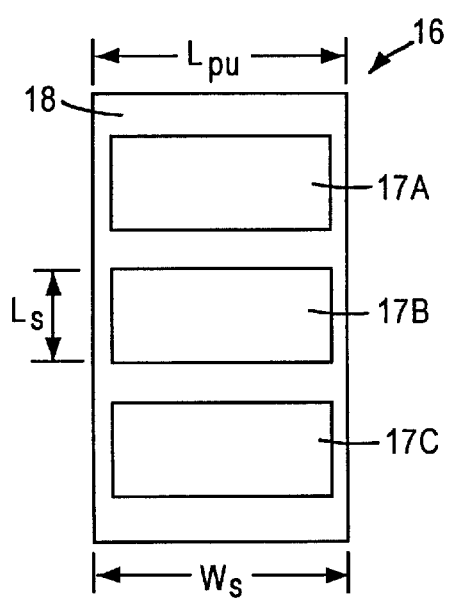
Figure 5B:
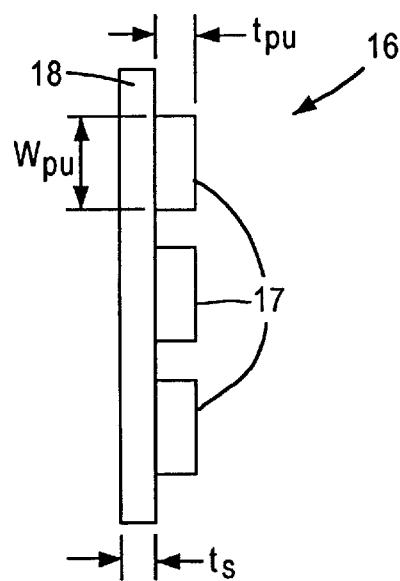

Referring to FIGS. 5A and 5B, there is illustrated an actual tile 16 for suppressing frequencies at 120 Hz (shear) and 380 Hz (compression). The acoustically absorbing tile 16 comprises a first layer 17 of polyurethane plastic and a second metal plate layer 18 attached to the polyurethane layer 17. The polyurethane plastic layer 17 is discontinuous and is formed by three separate blocks 17A, 17B, 17C of polyurethane material with gaps between them. The free surfaces of each of the polyurethane blocks 17 are secured to the inner surface of the support tower 2 by adhesive. The dimensions of the tile of FIGS. 5A and 5B are:

| | |
|---|---|
| Steel Plate: | |
| Width ($W_s$) | 100 mm |
| Length ($l_s$) | 180 mm |
| Thickness ($t_s$) | 13 mm |
| Mass | 1.82 kg |
| $\rho = 7825$ kg/m$^3$ | |
| Polyurethane Dimensions: | |
| Width ($w_{pu}$) | 92 mm |
| Length ($l_{pu}$) | 37 mm |
| Thickness ($t_{pu}$) | 7 mm |
| Number of blocks | 3 |
| PU Shiftness Parameters: | |
| Shear modulus G | 1.72E + 06 N/m$^2$ |
| Bulk modulus B | 2.2E + 09 N/m$^2$ |
| Constant k | 0.56 |
| Elastic mod. E | 9.52E + 06 N/m$^2$ |
| Calculated PU Parameters: | |
| Frequency ratio | 3.1 |
| Shape factor | 0.81 |
| Area/thickness | 629 mm |
| Area | 102 mm$^2$ |
| E/G | 5.535 |
| Calculated Resonant Frequencies: | |
| Compression frequency | 380 Hz |
| Shear frequency | 120 Hz. |

Three separate blocks of polyurethane can conveniently be used, but it may be possible to use other combinations.

The acoustically absorbing tiles could be attached to the outside of the tower, but attaching them to the inside is preferred to conceal the tiles, and protect them from weathering.

Conveniently the acoustically absorbing tiles are rectangular for easy manufacture and to allow them to fit together on the surface of the tower 2 but this is not essential.

In practice it has been found that it is not generally necessary to completely cover the tower 2 with acoustic damping tiles but that only the upper portion of the tower 2 nearest the nacelle 3 needs to mount tiles to prevent noise emission and that even in this region only a fraction of the tower surface needs to be covered, where a wind turbine emits noise at more than two discrete frequencies it is possible to interlace a corresponding number of separate arrays of acoustically absorbing tiles, each array being of tiles being optimised for different pairs of frequencies.

Other plastics materials besides polyurethane could be used to make the plastics or plastics foam layer, but polyurethane has been found to be particularly effective in practice because the elastic moduli of some polyurethanes change relatively little with temperature. This makes it easier to ensure that the acoustic absorbing tiles will prevent noise emission from the wind turbine under all weather conditions.

The tower 2 has been described as being circular in cross-section, it could of course be polygonal in cross-section without affecting the invention.

Although this invention has been discussed in terms of reducing or preventing noise emission from wind turbines the acoustically absorbing tiles can be usefully employed to prevent noise emission from any structures which emit noise at one or more discrete frequencies, such as transformers.

I claim:

1. An apparatus for reducing noise emission from a structure vibrating at two or more discrete frequencies, the apparatus comprising a plurality of vibration damping tiles secured to the surface of the structure, each tile comprising a high density layer linked to the structure by a layer of plastics material and having compression and shear modes of resonant frequencies, the mass of the high density layer, the dimensions of the layer of plastics material and the properties of the plastics material being selected such that the compression mode and shear mode resonant frequencies correspond respectively to two of said discrete frequencies.

2. An apparatus as claimed in claim 1 in which the plastics material is a plastics foam material.

3. An apparatus as claimed in claim 1 in which the layer of plastics material is discontinuous.

4. An apparatus as claimed in claim 1 in which the high density layer is a metal plate.

5. An apparatus as claimed in claim 1 in which the plastics material is polyurethane.

6. An apparatus as claimed in claim 1 wherein the two frequencies are within the range 100 Hz to 600 Hz.

7. An apparatus as claimed in claim 1 in which the structure is a transformer.

8. An apparatus as claimed in claim 1 wherein said tiles are mounted to less than one third of said structure.

9. A wind turbine comprising a nacelle and a support tower for the nacelle, the nacelle generating noise in the support tower at two or more discrete frequencies or frequency bands, a surface of the support tower having a least one vibration damping tile secured to it, the at least one tile comprising a high density layer linked to the tower by a less dense plastics material and having compression and shear modes of resonant frequencies, the mass of the high density layer, dimensions of the layer of plastics material and the properties of the plastics material being selected such that the compression mode and shear mode resonant frequencies correspond respectively to two of said discrete frequencies or frequencies bands of the nacelle and acting to reduce the amplitude of vibration of the support tower at those frequencies or frequency bands.

10. A wind turbine as claimed in claim 9 in which the plastics material is a plastics foam material.

11. A wind turbine as claimed in claim 9 in which the layer of plastics material is discontinuous.

12. A wind turbine as claimed in claim 9 in which the high density layer is a metal plate.

13. A wind turbine as claimed in claim 9 in which the plastics material is polyurethane.

14. A wind turbine as claimed in claim 9 wherein the two of said discrete resonant frequencies or frequency bands are in the range 100 Hz to 600 z.

15. A wind turbine as claimed in claim 9 wherein the tower is tubular and comprises vibration damping tiles located on the inner surface thereof.

16. A wind turbine as claimed in claim 9 wherein at least half of the noise radiating surface of the support structure is free of any noise insulating material.

17. A method of reducing vibrations in a structure comprising the steps of:

identifying two frequencies or frequency bands in the structure that it is desired to suppress;

constructing a plurality of mass damping tiles each comprising a high density layer and a layer of plastics material by which the high density layer is to be connected to the structure;

selecting the mass of the high density layer, the dimensions of the plastics material, and the properties of the plastics material such that the tile has a compression mode resonant frequency corresponding to one of the identified frequency or frequency bands, and a shear mode resonant frequency corresponding to the other identified frequency or frequency band; and securing said plurality of tiles to the structure.

18. A method as claimed in claim 17 comprising forming the layer of plastics material from a foam material.

19. A method as claimed in claim 17 comprising forming the layer of plastics material from polyurethane.

20. A method as claimed in claim 17 comprising forming the layer of plastics material as a plurality of discontinuous sections.

21. A method as claimed in claim 17 comprising using a metal plate as the high density layer.

22. A method as claimed in claim 17 for reducing vibrations in the range 100 Hz to 600 Hz.

23. A method of suppressing vibrations in a support tower of a wind turbine by applying the method of claim 17 to the upper position of the support tower.

24. A method as in claim 17 comprising the steps of:

(1) determining the two frequencies to be suppressed and selecting the resonant compression frequency $f_c$ and the resonant shear frequency $f_s$;

(2) selecting the mass m of the high density layer for an acceptable footprint area and consideration of practical constraints on width, length, height and dimensions of standard steel plate;

(3) using equation 1 wherein shear frequency $$f = \frac{\sqrt{K/m}}{2\pi},$$

experimentally determining a shear modulus G for the selected plastics material layer, substituting G.A/t for K, plotting shear frequency against different areas to determine G at the desired shear frequency, wherein K is the spring stiffness of the plastics material layer, A is the loaded area of the plastics material layer, and t is the thickness of the plastics material layer;

(4) making an approximation for a value of Young's Modulus E for the plastics material layer and, substituting this in equation 2 wherein $f_c/f_s = \{E(1+2kS^2)/G (1+E(1+2kS^2)/B\}^{1/2}$, obtaining an approximate value for S, wherein S is the shape factor of the plastics material layer, B is the bulk modulus of the plastics material layer, and k is a constant;

(5) generating a number of tiles having different loaded area to free area ratios to the approximate value of S and measuring $f_c$ and $f_s$ for each to produce a number of points and plotting these on a graph of frequency ratio $f_c/f$ versus the shape factor;

(6) empirically determining the value for E in equation 2 above which produces the best fit line for the points obtained in step 5 above and defining this as the effective value of E;

(7) for the above effective value of E, calculating a more precise value of S from equation 2 above and generating appropriate tile.

* * * * *